United States Patent [19]

Ruthrof et al.

[11] 4,370,889
[45] Feb. 1, 1983

[54] TEST DEVICE FOR THE DETECTION AND ANALYSIS OF MATERIAL FAULTS

[75] Inventors: Klaus Ruthrof; Rainer Meier, both of Erlangen, Fed. Rep. of Germany

[73] Assignee: Kraftwerk Union Aktiengesellschaft, Mülheim, Fed. Rep. of Germany

[21] Appl. No.: 185,750

[22] Filed: Sep. 10, 1980

[30] Foreign Application Priority Data

Sep. 12, 1979 [DE] Fed. Rep. of Germany ....... 2936882

[51] Int. Cl.³ .............................................. G01N 29/04
[52] U.S. Cl. ................................ 73/619; 73/432 SD; 376/249
[58] Field of Search ................. 73/619, 618, 633, 634, 73/1 DV, 432 SD; 376/249

[56] References Cited

U.S. PATENT DOCUMENTS 4,055,989 11/1977 Henry, Jr. et al. .................... 73/619
4,213,183 7/1980 Barron et al. .......................... 73/634

OTHER PUBLICATIONS

M. W. Moyer et al., "Expanding the Capability of a Laboratory Ultrasonic Testing Facility", *Materials Evaluation*, pp. 193–198 and 204, Oct. 1973.

*Primary Examiner*—Stephen A. Kreitman
*Attorney, Agent, or Firm*—Herbert L. Lerner; Laurence A. Greenberg

[57] ABSTRACT

Test equipment for the detection and analysis of material faults in a test piece, including a test head, an electrical remotely controlled manipulator for moving the test head in at least two degrees of freedom, a device connected to the test head for supplying the test head and evaluating signals thereof, a display connected to the test head for measuring test results thereof, a device for providing the manipulator with a testing program for automatically following a predetermined path at the surface of the test piece, an electronic transmission system connected to the manipulator, a device connected to the electronic transmission system for simulating the test piece, and a remote controlled hand-operated guide element disposed adjacent to the display in the simulating means for controlling the test head in correspondence to manual operation.

12 Claims, 2 Drawing Figures

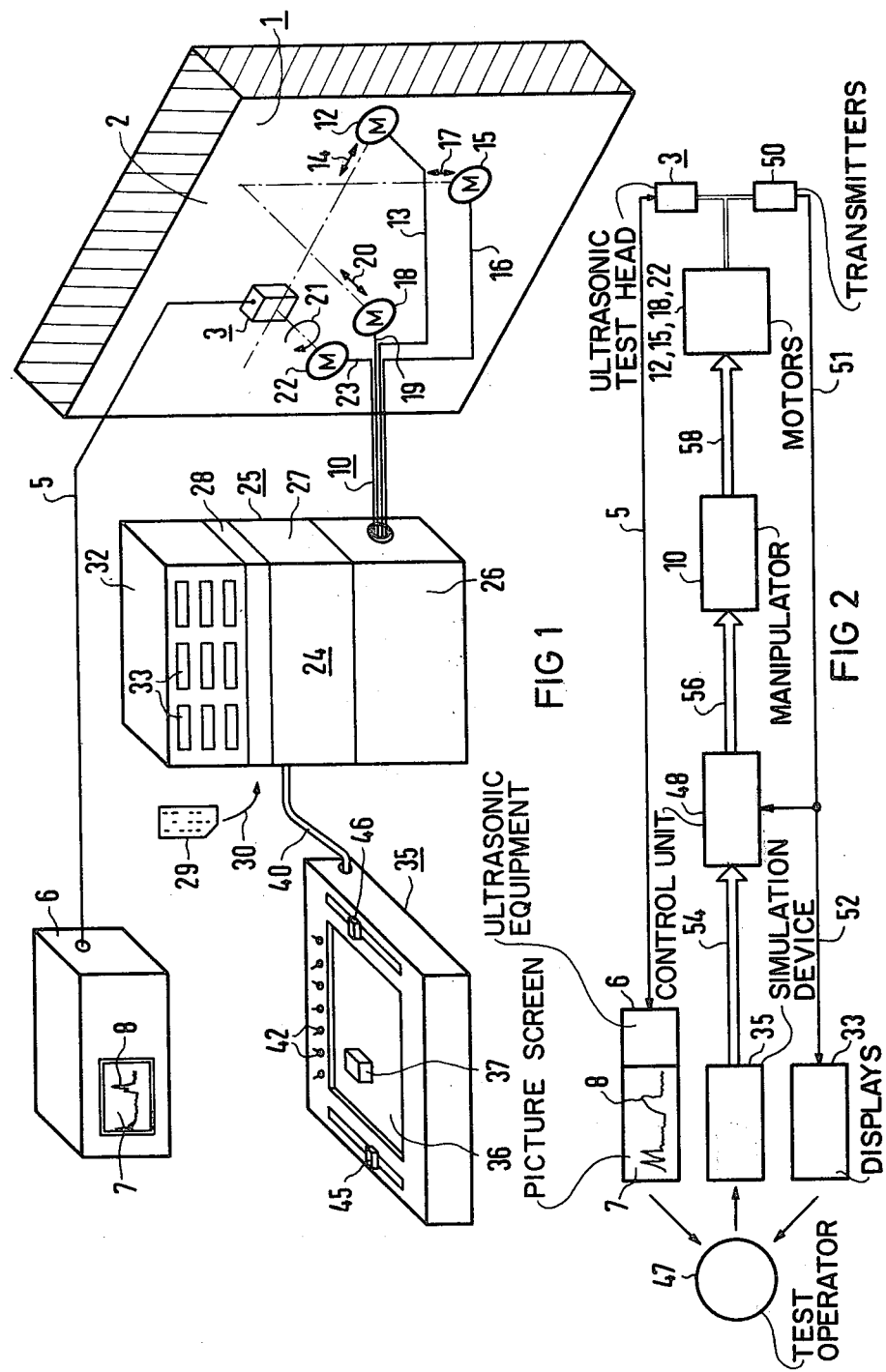

TEST DEVICE FOR THE DETECTION AND ANALYSIS OF MATERIAL FAULTS

BACKGROUND OF THE INVENTION

1. Field of the Invention

The invention relates to a test equipment for the detection and analysis of material faults in a test piece, particularly in pressure-carrying components for nuclear installations, comprising a manipulator which can be remotely controlled in at least two degrees of freedom by electrical actuation in order to move a test head, a test equipment for supplying the test head, and evaluation of its signals, and a display device for the measurement results of the test head, wherein the manipulator is provided with a testing program for automatically following a predetermined path at the surface of the test piece.

2. Description of the Prior Art

By means of the testing program, the test head carried by the manipulator is to be guided along a predetermined testing path over the surface of the test piece. As a rule, the test path is a meander-path with test tracks so closely adjacent each other that faults to be detected are found with certainty. However, the rigid fixation of the movement of the test head narrows down the possibilities of fault analysis, such as the determination of the shape and position of such faults.

It is accordingly an object of the invention to provide a test equipment for the detection and analysis of material faults, which overcomes the hereinafore-mentioned disadvantages of the heretoforeknown devices of this general type, and to improve the determination and analysis of material faults. It is furthermore an object to attempt to find a possibility for utilizing the "fingertip feeling" which is acquired by testing personnel in the manual operation of test heads and which has been found extremely valuable in the detection of faults and cannot be practically duplicated by mechanized processes.

SUMMARY OF THE INVENTION

With the foregoing and other objects in view there is provided, in accordance with the invention, a test equipment for the detection and analysis of material faults in a test piece, particularly in pressure-carrying components for nuclear installations, comprising a test head, electrical remotely controlled manipulator means for moving the test head in at least two degrees of freedom, means connected to the test head for supplying the test head and evaluating signals thereof, display means connected to the test head for measuring test results thereof, means for providing the manipulator means with a testing program for automatically following a predetermined path at the surface of the test piece, an electronic transmission system connected to the manipulator means, means connected to the electronic transmission system for simulating the test piece, and a remote controlled hand-operated guide element disposed adjacent to the display means in the simulating means for controlling the test head in correspondence to manual operation.

In simpler words, the invention accordingly includes a supplement to the automated testing, customary heretofore by means of a testing program, by providing a possibility for operation by means of which the test operator can move the test head carried by the manipulator in a manner as if it were guided directly by hand. It is therefore possible to again utilize the knowledge and skill of the test personnel for the exact determination and analysis of material faults.

"Manual operation" of the test head by the test personnel can be further improved in the invention by far-reaching simulation of the circumstances in manual testing. To this end, in accordance with another feature of the invention the guide element is in the form of a simulated test head. This means that instead of using a control element in the form of a standard handle, the test operator operates a control element in the shape of the test head familiar to him from manual testing, if the manipulator must be steered with a particularly fine feel in order to determine the exact position or dimensions of the fault, for instance after a fault is found. In this process, the test operator is guided by the indications of the measurement results on the display device as in manual testing.

In accordance with a further feature of the invention, the simulation means includes a simulation of at least part of the surface of the test piece, and the guide element is movably disposed on the surface simulation. As simulation, a portion of the surface of the test piece may in some circumstances be sufficient. The guide element is movably disposed over the simulation so that the test operator also finds circumstances here familiar to him from manual testing and he utilizes his knowledge and skill, partly subconsciously, in guiding the test head.

The simulation of the test piece is customarily in a one-to-one scale, so that the same circumstances prevail as in manual testing. Therefore, in accordance with an added feature of the invention, the transmission system for the hand-operated remote control of the manipulator has a given linear amplification, and the test piece surface simulation has a scale equal to the linear amplification. However, it may also be advantageous to make the simulation smaller or larger than the test piece and to take into consideration the scale of the simulation in the amplification of the manually operated remote control of the manipulator in the transmission system. In some circumstances one can then obtain guidance with an even finer feel with better analysis results than with a one-to-one simulation.

In accordance with an additional feature of the invention, there are provided means for individually adjustably setting scales for the degrees of freedom of the manipulator. In this way adaptation to special conditions is possible, such as for heavy curvature of the surface to be tested.

In accordance with yet another feature of the invention, the manipulator includes means operable by the simulating means for forming a marking on the test piece. This can facilitate the relocalization of detected faults for repair purposes, for instance. For relocalization, in accordance with yet a further feature of the invention, the manipulator includes a sensor for localizing the marking.

In accordance with yet an added feature of the invention, the marking is imaged on the surface simulation. This is particularly advantageous if special or further test heads are to be used for the more exact investigation of a material faults as will be described hereinbelow.

In accordance with yet an additional feature of the invention, the manipulator includes at least partly separate operating means for control by the test program and manual control by the guide element.

In accordance with again another feature of the invention, there are provided additional operating means for manual control by the guide element. For instance, the manual actuation can comprise, additionally to the means for the automatic motion of the test piece controlled in two coordinates, for hand-operated rotation which improves the analysis of faults.

In accordance with again a further feature of the invention, there are provided additional test heads manually operable by the guide element. Therefore, test heads can be additionally employed which may have higher resolution or special directional characteristics. In an ultra sound testing system, in accordance with again an added feature of the invention, there are provided ultrasonic testing systems having test heads movable in tandem, and means for moving the test heads relative to each other. In addition, the manual control according to the invention can also be executed by means of separate actuation means, i.e. with drive devices which operate independently of the programmed control. It is merely necessary here to provide that the different actuating devices do not interfere with each other.

Other features which are considered as characteristic for the invention are set forth in the appended claims.

Although the invention is illustrated and described herein as embodied in a test device for the detection and analysis of material faults, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which:

FIG. 1 is a partly sectional diagrammatic perspective and partially schematic view of the physical construction of the test equipment according to the invention; and FIG. 2 is a block diagram which illustrates the influencing possibilities and the flow of data in the measurement.

DESCRIPTION OF THE PREFERRED EMBODIMENT

Referring now to the figures of the drawing and first particularly to FIG. 1 thereof, it is seen that the test piece is designated with reference numeral 1 . The test piece can only be seen in the figure as a cross-section. It may, for instance, be the 15 cm thick wall of a metallic pressure vessel for a pressurized-water reactor. The wall is to be tested for cracks by means of ultrasound. For this purpose, an ultrasound or ultrasonic test head 3 is moved at the surface 2 of the test piece 1 along predetermined especially reproducible paths. The test head 3 may be a multiple arrangement of individual heads and is connected by a transmitting and receiving line 5 to ultrasonic equipment 6. Part of the equipment 6 is a picture screen 7 which is used as the display device, on which the ultrasonic echoes 8 that occur in the event of a disturbance can be seen.

The test head 3 is operated by a manipulator designated as a whole with reference numeral 10. The manipulator 10 is shown in a simplified manner by only illustrating the electrical drives for the movements of the manipulator and the control lines leading thereto. These involve, in detail, the following electric drive means, each assigned to one degree of freedom:

The motor 12 with the control line 13 provides a straight-line movement in the horizontal X-direction as indicated by the arrow 14. The motor 15 with the control line 16 causes an adjustment perpendicular to the X-direction, in the Y-direction according to the arrow 17. The X- and Y-directions are parallel to the plane of the surface 2 of the test piece 1, which is thought of as planar. The motor 18 with the control line 19 serves for adjustment in the Z-direction perpendicular to the surface 2, as indicated by the arrow 20. As a further and additional function in the sense of the explanations above, a motor 22 with a control line 23 is provided, which causes a rotation of the test head according to the arrow 21, thus forming additional operating means for control by the test program and manual control by the guide element.

The control lines 13, 16, 19 and 23 lead to an electronic transmission system 24, which is housed in an electronic cabinet 25 shown in FIG. 1. The electronic transmission system 24 includes the power electronic circuitry 26 disposed in the lower part of the cabinet 25 as well as adapters to the drives and the servo-control (part 27 in the electronics cabinet 25). The program control 28, located above, allows the entry of the test program for automatic testing through coding switches or data carriers, such as punch cards 29 for example, as the arrow indicates.

The upper part 32 of the electronics cabinet 25 contains the display elements for the position of the test head 3, which can be seen from FIG. 1. The display elements 33 provide, for instance, in digital form, a formation regarding the location of the test head, which is encoded with respect to the directions of motion of the positioning motors 12, 15 and 18.

Next to the electronics cabinet, a simulation device, designated as a whole with reference numeral 35, is shown in simplified form. The simulation device 35 includes a fractional simulation 36 of the surface 2 of the test piece 1. Above the simulation 36, a guide element 37 which is simulated in the form of the test head 3, is movably disposed. Between the guide element 37 and the simulation 36, sensors are disposed in such a manner that motions which are transmitted by hand to the guide element 37 relative to the simulation 36, are picked up and coded according to the degrees of freedom of the positioning motors 12, 15, 18 and 22. The motions are thus converted into electrical signals and are fed through the connecting cable 40 to the control part in the electronics cabinet 25, if the switches 42 provided at the simulation device 35, are actuated. This is done because the automatic control of the manipulator 10 determined by the program 29 is interrupted thereby and the manual control by the guide element 37 is made operative.

In the embodiment example, it is assumed that not only are the three positioning motors 12, 15 and 18 for the straight line adjustment of the test head 3 operated with the guide element 37, but they can also be set in operation by the program control 28. There is rather also provided, for the analysis of faults by test heads with oblique insonification, rotation by means of the positioning motor 22, which is controlled by a rotation of the guide element 37 about an axis extended at a right angle to the plane of the simulation 36. As a result this yields an identical rotation of the test head 3, indicated by the arrow 21, on the surface 2 of the test piece 1. In particular, with this or additional rotation, a skilled test operator can obtain more acurate information regarding the shape and position of faults with the simulated manual test with the aid of the displays on the picture screen 7. For instance, more accurate information regarding the length and direction of cracks can be gained, than is possible with a purely automatic control according to the testing program 29.

FIG. 1 shows that the simulating device 35 further has two control knobs 45 and 46 on both sides of the simulation 36. With these, supplemental functions can be controlled. For instance, in a position of a manipulator with a tandem test system occupied by the manual control, the control knob 45 can serve for obtaining a change of the spacing of two test heads which allows the testing of different depth ranges of the test piece. By means of the control knob 46, the test frequency, for instance, could be varied in eddy current tests for "manual operation".

By operating one of the switches 42, a marking can also be applied to the surface 2 of the test piece 1. The marking may be an electrical, magnetic or optical identification. However, it may also be a mechanical effect such as with a prick punch, which in turn can be located again, for instance, by an ultra sound measurement or by magnetic detection, for instance, with the aid of eddy current.

FIG. 2 shows the control-engineering interrelations of the test system shown in FIG. 1. It is seen that the ultra sound test head 3 is connected by the line 5 to the ultrasonic equipment 6, so that the displays 8 are available to the test operator directly on the monitor 7; the test operator is indicated in FIG. 2 by the circle 47. Positioned transmitters 50 are associated with the ultra sound test head 3. These are operated, together with the ultrasonic test head, by the drives 12, 15, 18 and 22. The drives are part of the manipulator 10. The manipulator 10 in turn is operated by a control unit 48. In practice, the control unit 48 corresponds to the parts 26 and 27 of the electronics cabinet 25 and is supplied additionally through the line 51 with the actual values of the position of the test head 3. These actual values are further fed through a further line 52 to the positioned displays 33 which thus are also available to the operator 47. The operator can therefore act on the test head 3 through the simulating device 35 in a way similar to manual control, because he feeds a control variable to the control unit 48 according to the arrow 54 which derives a positioning variable from the difference of the actual position values. The positioning variable is then fed to the manipulator 10 in accordance with the arrow 56, so that the adjustment of the ultrasonic test head 3 is carried out as is done with direct manual operation by the movement of the drives according to the arrows.

The ultrasonic test instrument is, for example, marketed by the firm Krautkraemner, Cologne, Germany under the designation USIP 11 and by the firm RTD, Rotterdam, Holland under the name Sonolog 73.

The electronic cabinet or console 25 contains electrical components, as explained hereinbefore. Suitable components are sold in the United States, such as, for example, by the firm Data General according to the leaflet 012-246. Similar and further components are made by the German firm Heldt+Rossi and Johne+-Reilhofer, according to their literature.

The simulation device which is designated as a whole with reference numeral 35 is a synthetic or plastic plate which has sensors at the bottom thereof that are commercially available, along which a guide element or component 37 which influences the sensors can be moved. This component 37 is similar in form to the test head 3. In this way, it is possible for the person who operates the equipment to remotely operate the test head 3 through the manipulator with the same action as used in manual operation, because the motion given to the guide element 37 by the hand of the operator by means of the sensors of the simulation device 35 takes over the control of the manipulator 10. Literature concerning the sensor-equipped plastic plate is also available. This arrangement is augmented by the switches and adjusting knobs described in detail herein.

There are claimed:

1. Test equipment for the detection and analysis of material faults in a test piece, comprising a test head, electrical remotely controlled manipulator means for moving said test head in at least two degrees of freedom, means connected to said test head for supplying said test head and evaluating signals thereof, display means connected to said test head for measuring test results thereof, means for providing said manipulator means with a testing program for automatically following a predetermined path at the surface of the test piece, an electronic transmission system connected to said manipulator means, means connected to said electronic transmission system for simulating the test piece, and a remote controlled hand-operated guide element disposed adjacent to said display means in said simulating means for controlling said test head in correspondence to manual operation.

2. Test equipment according to claim 1, wherein said guide element is in the form of a simulated test head.

3. Test equipment according to claim 1 or 2, wherein said simulation means includes a simulation of at least part of the surface of the test piece, and said guide element is movably disposed on said surface simulation.

4. Test equipment according to claim 3, wherein said transmission system for the hand-operated remote control of said manipulator has a given linear amplification, and said test piece surface simulation has a scale equal to said linear amplification.

5. Test equipment according to claim 4, including means for individually adjustably setting scales for said degrees of freedom of said manipulator.

6. Test equipment according to claim 1, wherein said manipulator includes means operable by said simulating means for forming a marking on the test piece.

7. Test equipment according to claim 6, wherein said manipulator includes a sensor for localizing the marking.

8. Test equipment according to claim 6 or 7, wherein said simulation means includes a simulation of at least part of the surface of the test piece, said guide element is movably disposed on said surface simulation, and the marking is imaged on said surface simulation.

9. Test equipment according to claim 1, wherein said manipulator includes at least partly separate operating means for control by the test program and manual control by said guide element.

10. Test equipment according to claim 9, including additional operating means for manual control by said guide element.

11. Test equipment according to claim 10, including additional test heads manually operable by said guide element.

12. Test equipment according to claim 10 or 11, including ultrasonic testing system having test heads movable in tandem, and means for moving said test heads relative to each other.

* * * * *